T. G. BENNETT.
METHOD OF AND APPARATUS FOR DETECTING AND LOCATING CROOKS IN GUN BARRELS.
APPLICATION FILED APR. 26, 1916.
1,206,502.
Patented Nov. 28, 1916.
2 SHEETS—SHEET 1.
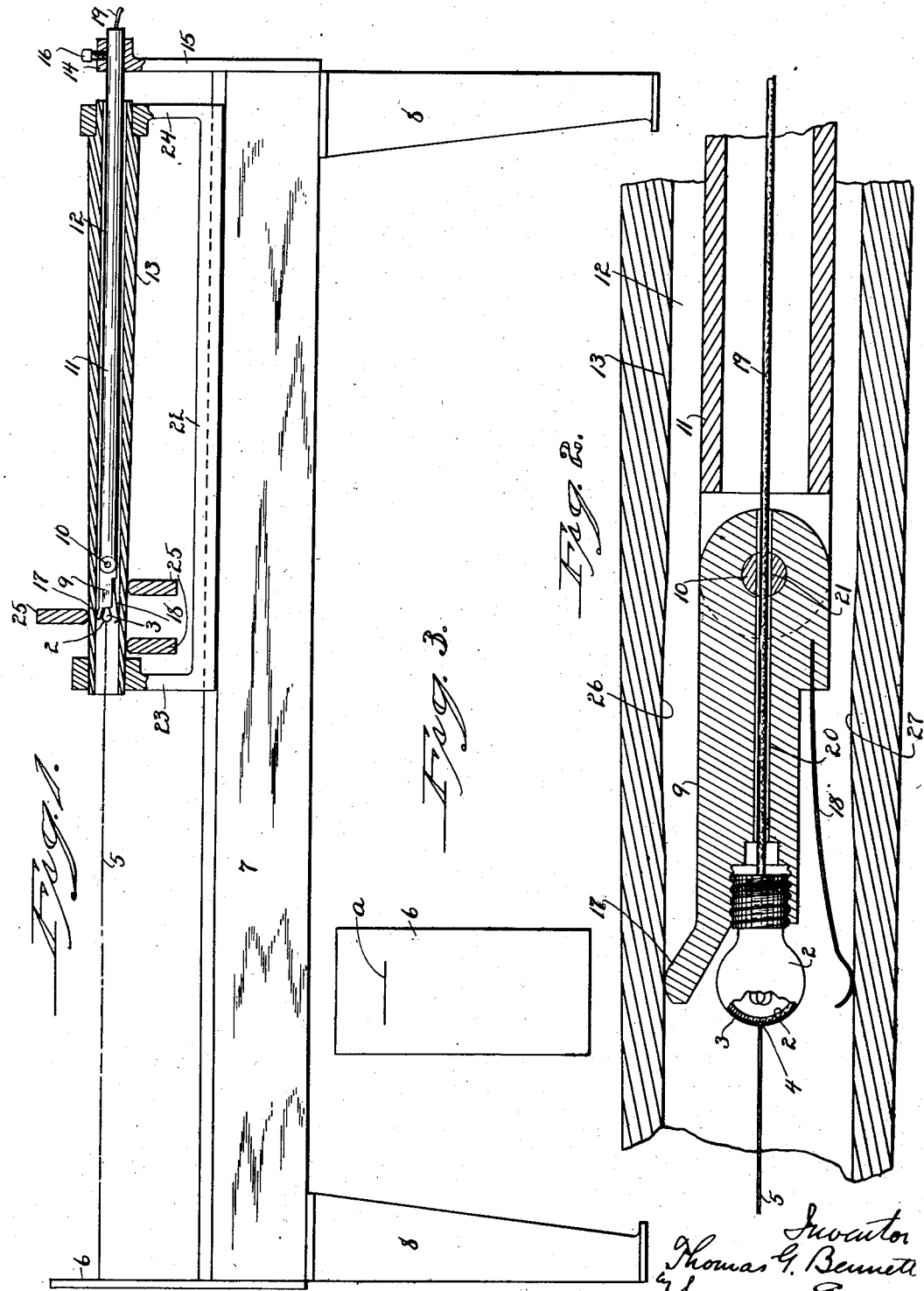

T. G. BENNETT.
METHOD OF AND APPARATUS FOR DETECTING AND LOCATING CROOKS IN GUN BARRELS.
APPLICATION FILED APR. 26, 1916.
1,206,502.
Patented Nov. 28, 1916.
2 SHEETS—SHEET 2.
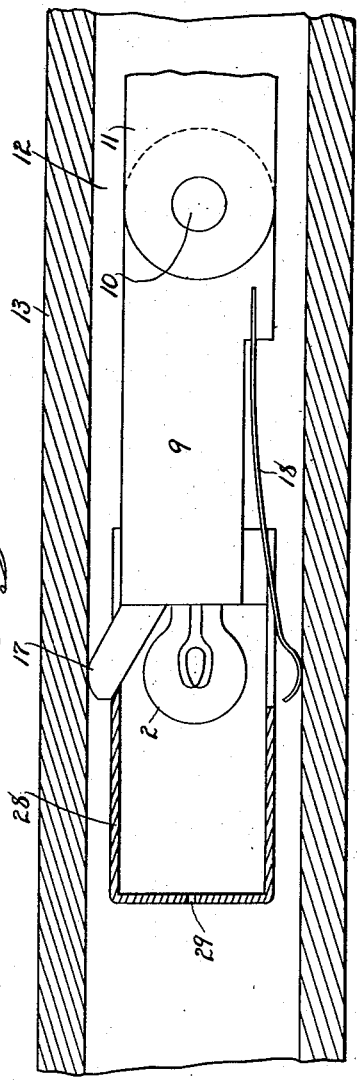
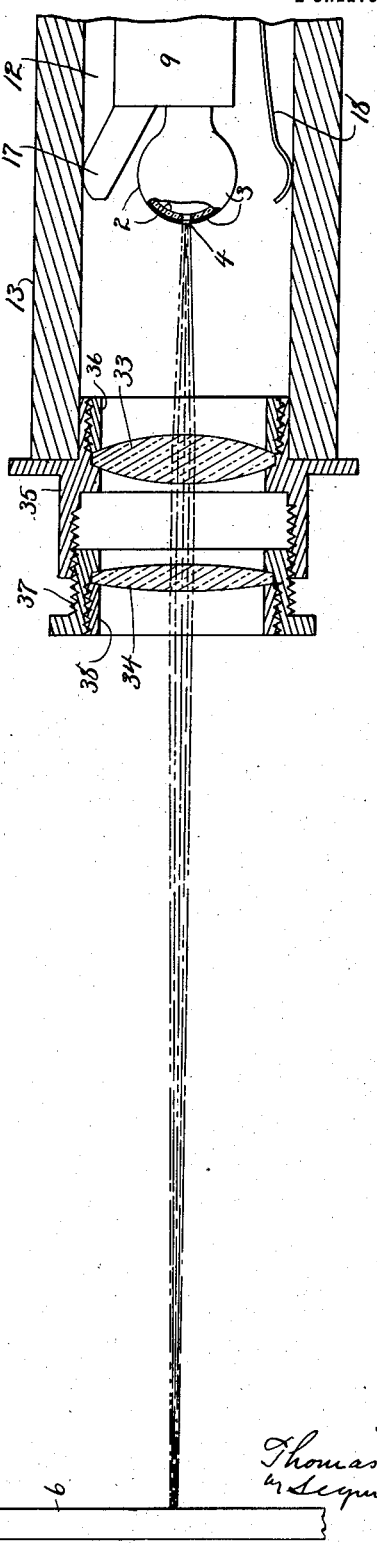
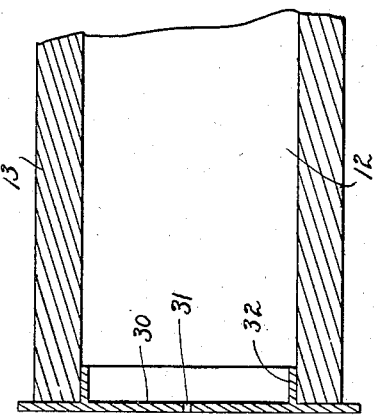

UNITED STATES PATENT OFFICE.

THOMAS G. BENNETT, OF NEW HAVEN, CONNECTICUT, ASSIGNOR TO WINCHESTER REPEATING ARMS CO., OF NEW HAVEN, CONNECTICUT, A CORPORATION.

METHOD OF AND APPARATUS FOR DETECTING AND LOCATING CROOKS IN GUN-BARRELS.

1,206,502. Specification of Letters Patent. Patented Nov. 28, 1916.

Application filed April 26, 1916. Serial No. 93,808.

*To all whom it may concern:*

Be it known that I, THOMAS G. BENNETT, a citizen of the United States, residing at New Haven, in the county of New Haven and State of Connecticut, have invented a new and useful Improvement in Methods of and Apparatus for Detecting and Locating Crooks in Gun-Barrels; and I do hereby declare the following, when taken in connection with the accompanying drawings and the characters of reference marked thereon, to be a full, clear, and exact description of the same, and which said drawings constitute part of this application, and represent, in—

Figure 1 a view partly in side elevation and partly in vertical longitudinal section of one form which an apparatus embodying my invention may assume. Fig. 2 a broken detail view of the device in vertical longitudinal section on an enlarged scale. Fig. 3 a detached face view of the screen. Fig. 4 a broken view in vertical longitudinal section of one of the modified forms which my improved apparatus may assume. Fig. 5 a broken view of the muzzle-end of a gun provided with a removable diaphragm formed with a light-transmitting aperture. Fig. 6 a broken view in vertical longitudinal section of another form which my apparatus may assume.

My invention relates to an improved method of, and apparatus for, detecting and locating crooks in gun-barrels. The shadow method commonly employed for this purpose is effective so far as results are concerned, but slow and expensive and requiring such peculiar aptitude and delicacy of perception on the part of the workmen, that few become adept in it. Various devices have been devised for taking the place of the shadow method referred to, but none of them have been found to equal it in the results secured, or in practicability, notwithstanding the difficulties that it presents.

The object of my present invention is to provide an improved method of, and apparatus for, detecting and locating crooks in gun-barrels, whereby such work can be carried on rapidly by relatively unskilled workmen.

With this object in view, my invention resides in a method of detecting and locating crooks in gun-barrels, characterized by the projection of a beam of light from within the bore of the gun-barrel, moving the barrel relatively to the source of the beam of light and parallel thereto and keeping the beam of light at a fixed distance from the wall of the bore of the barrel during such movement.

My invention further consists in an apparatus characterized by a lamp-carrier adapted to be located within the bore of a gun-barrel and carrying a lamp from which a beam of light is projected from within the barrel upon a screen outside of the barrel, and a gun-barrel support, one of the said parts being movable in line with the other to permit the carrier to be brought into contact with the various portions of the wall of the bore of the barrel.

My invention further consists in a method having certain steps, and an apparatus having certain details, as will be hereinafter described and pointed out in the claims.

In carrying out my invention as herein shown, I employ a very small incandescent electric lamp 2 the bulb of which is provided with an opaque coating 3 having in its center an opening 4 for the projection of a well defined beam of light 5 through it upon a fixed screen 6 having a horizontal index-mark *a* and secured in vertical position to one end of a bed 7 on legs 8. The lamp 2 aforesaid has its socket threaded into the outer end of a pivotal lamp-carrier 9 mounted so as to swing on a pivot 10 passing through the forward end of a fixed horizontally arranged tubular lamp-carrier holder 11 smaller in diameter than the diameter of the bore 12 of the gun-barrel 13. The said lamp-carrier holder 11 is rigidly supported at its outer end in the hub 14 of a bracket 15 secured to the bed 7, the hub 14 being furnished with a set-screw 16 for rigidly supporting the said holder 11. At its outer end, the lamp-carrier 9 is provided with a contact-finger 17 having a rounded outer face which rides upon the wall of the bore 12.

Opposite the contact-finger 17 is a spring 18 the rear end of which is mounted in the lamp-carrier 9, the said finger 17 and spring 18 being located on opposite sides of the lamp 2 which is supplied with a current through fine wires in a small cable 19 passing through a longitudinal opening 20 in the lamp-carrier, through a corresponding opening 21 in the pivot 10, and also passing through the tubular lamp-carrier holder 11. The combined action of the finger 17 and spring 18 keeps the lamp 2 at a constant distance from the wall of the bore of the gun-barrel at any given point. For supporting the gun-barrel 13, I employ, as shown, a slide 22 adapted to move back and forth on the bed 7 in line with the lamp-carrier holder 11, the said slide 22 being formed at its respective ends with upstanding arms 33, 34, for the reception, respectively, of the breech and muzzle ends of the gun-barrel 13 which is free to be rotated in the said arms 23 and 24. Three-point straightening means 25 located on opposite sides of the barrel are indicated, but may be replaced by any device of any description which will answer the purpose.

In practising my improved method, the gun-barrel is mounted in the slide 22, after which the barrel is passed breech-end first, as shown, or muzzle-end first, if preferred, over the yielding lamp-carrier 9 carrying the lamp 2 and pivotally mounted in the rigid, tubular lamp-carrier holder 11. Now as long as the finger 17 makes contact with true surfaces within the bore of the gun-barrel, the beam of light 5 projected through the aperture 4 in the opaque covering 3 of the lamp 2, will intersect the index mark $a$ on the fixed screen 6. In case, however, the finger 17 rides into a hollow, such as 26, in the wall of the bore, it will follow the curvature thereof under the influence of the spring 18 which will turn the lamp-carrier 9 upward on its pivot 10 and cause the beam 5 to be projected above the horizontal index mark $a$. The amount of this deflection indicates to the operator, the degree of departure from exact accuracy in the wall of the bore at the point covered, as it were, by the finger 17. A crook having thus been detected and located, it is removed in the usual manner such as by the three-point straightening means 25, either at the time, or the point may be marked to be attended to later. In this manner, the slide 22 is moved back and forth so as to present the full length of the bore in one line to the finger 17. The barrel is now rotated a step and then moved back and forth to expose every portion of another longitudinal section of the wall of its bore to the searching action of the finger 17. The barrel is then again rotated and the process repeated until the entire bore has been progressively subjected to the searching action of the finger 17. In case the finger 17 strikes a protrusion 27 in the bore, then the lamp-carrier 9 will be swung downward upon its pivot against the tension of the spring 18 with the effect of projecting the beam 5 upon the screen 6 at a point below the index-mark $a$. By employing a beam of light projected from within the barrel upon a stationary screen without the barrel, the workman is enabled to detect and locate any departure from straightness in the bore of the barrel, without any special skill or delicacy of perception on his part, whereas, the practice of the shadow method of straightening gun-barrels, requires a keen eye to detect the crook, and a trained eye to judge of its precise location.

In the modified form of my improved apparatus shown by Fig. 4, the coating 3 is left off the lamp 2, its place being taken by a sleeve-like diaphragm 28 having a light-transmitting aperture 29 applied to the lamp-carrier 9 so as to move therewith as a part thereof.

In the modified form shown by Fig. 5, a diaphragm 30 having a light-transmitting aperture 31 is applied to the muzzle-end of the gun-barrel by means of a flange 32. In effect, the apertures 29 and 31 correspond to the aperture 4 in the coating 3 of the lamp 2, in so far as they provide sufficiently well defined beams of light for the purpose in hand.

In the modified construction shown by Fig. 6, the lamp 2, as in Fig. 2, is provided with a coating 3 having an aperture 4 from which a beam of light is projected through one or more lenses mounted in the muzzle-end of the gun-barrel and arranged to concentrate a beam of light upon a suitable screen 6. As shown, I employ a fixed lens 33 and an adjustable lens 34, the lens 33 being mounted in a flanged and threaded ring 35 in which it is held by a threaded retaining-ring 36, while the lens 34 is mounted in a threaded sleeve 37 in which it is held by a retaining-ring 38. But the number, arrangement and mode of mounting the lenses may be varied, as desired. The action of the lens or lenses is to concentrate the light diffused by the lamp 2 upon the screen. If desired the user of the modified form of apparatus shown in Fig. 6, may observe the action of the lamp-carrier 9 by looking through the lens or lenses into the gun-barrel which will be illuminated by the lamp.

I claim:—

1. A method of detecting and locating crooks in gun-barrels, the said method being characterized by the projection of a beam of light from within the bore of the gun-barrel, moving the barrel relatively to the beam of light and parallel thereto, and keeping the source of the beam of light a fixed distance from the wall of the bore of the barrel during such movement.

2. A method of detecting and locating crooks in gun-barrels, the said method being characterized by progressively subjecting the several portions of the wall of the bore of a gun-barrel to the action of a carrier supporting a lamp from which a beam of light is projected from within the gun-barrel upon a screen located outside of the barrel, the carrier being constructed to follow the walls of the bore and to maintain the lamp at a constant distance therefrom at any given point.

3. In an apparatus for detecting and locating crooks in gun-barrels, the combination with a yielding lamp-carrier adapted to be located within the bore of the gun-barrel and carrying a lamp from which a beam of light is projected from within the barrel upon a screen located outside of the barrel, and a gun-barrel support, one of the said parts being movable in line with the other to permit the lamp-carrier to be brought into contact with the various surfaces of the wall of the bore of the barrel.

4. In an apparatus for detecting and locating crooks in gun-barrels, the combination with a yielding lamp-carrier adapted to be located within the bore of a gun-barrel and carrying a lamp from which a beam of light is projected from within the barrel upon a screen located outside of the barrel, and a gun-barrel support, one of the said parts being movable in line with the other, and one of the said parts being rotatable with respect to the other, to permit the lamp-carrier to be progressively brought into contact with the various portions of the wall of the bore of the barrel.

5. In an apparatus for detecting and locating crooks in gun-barrels, the combination with a yielding carrier, of a lamp carried thereby and adapted to project a beam of light from within the bore of the barrel upon a screen located outside of the barrel, a holder upon which the said carrier is pivotally mounted, means for supporting the said holder, and a slide adapted to support a gun-barrel and to be moved longitudinally with respect to the said carrier and to permit the barrel to be rotated with respect thereto.

THOMAS G. BENNETT.